(12) United States Patent
Shi et al.

(10) Patent No.: US 12,339,244 B2
(45) Date of Patent: Jun. 24, 2025

(54) WETNESS SENSOR, METHOD AND SYSTEM FOR SENSING AN AMOUNT OF A WETTING AGENT

(71) Applicant: Sakuu Corporation, San Jose, CA (US)

(72) Inventors: Steven Zhichao Shi, Santa Clara, CA (US); Morteza Vatani, Los Gatos, CA (US); Seyed Mohammad Sajadi, San Jose, CA (US)

(73) Assignee: Sakuu Corporation, San Jose, CA (US)

( * ) Notice: Subject to any disclaimer, the term of this patent is extended or adjusted under 35 U.S.C. 154(b) by 411 days.

(21) Appl. No.: 18/074,341

(22) Filed: Dec. 2, 2022

(65) Prior Publication Data

US 2024/0183811 A1 Jun. 6, 2024

(51) Int. Cl.
| | |
|---|---|
| *G01N 27/12* | (2006.01) |
| *B29C 64/393* | (2017.01) |
| *B33Y 30/00* | (2015.01) |
| *B33Y 50/02* | (2015.01) |
| *B29K 105/00* | (2006.01) |

(52) U.S. Cl.
CPC ......... *G01N 27/121* (2013.01); *B29C 64/393* (2017.08); *B33Y 30/00* (2014.12); *B33Y 50/02* (2014.12); *B29K 2105/251* (2013.01); *B29K 2995/0037* (2013.01)

(58) Field of Classification Search
CPC .... G01N 27/121; B29C 64/393; B33Y 30/00; B33Y 50/02; B29K 2105/251; B29K 2995/0037
USPC .......................................... 700/117
See application file for complete search history.

(56) References Cited

U.S. PATENT DOCUMENTS

2021/0016510 A1* 1/2021 Sosnowski ............. G05D 22/02

* cited by examiner

*Primary Examiner* — Michael J Brown
(74) *Attorney, Agent, or Firm* — Arman Khosraviani

(57) ABSTRACT

A wetness sensor, and a method and system using such a sensor, for detecting amounts of a wetting agent in a wetting agent absorbing material, including a sensor device located in contact with the wetting agent absorbing material and configured to monitor a parameter of the wetting agent absorbing material which varies in dependence on an amount of the wetting agent in the wetting agent absorbing material.

25 Claims, 9 Drawing Sheets

WETNESS SENSOR, METHOD AND SYSTEM FOR SENSING AN AMOUNT OF A WETTING AGENT

TECHNICAL FIELD AND BACKGROUND

The present disclosure pertains to an improved wetness sensor, and a method and system for using such a sensor to sense an amount of a wetting agent in, for example, a wetting agent absorbing material.

In U.S. Provisional Application 63/299,816, filed on Jan. 14, 2022, which is hereby incorporated by reference, in a 3D additive manufacturing system (AM), powder is deposited on a web substrate to form a powder layer, and a wetting agent or a lubricant is applied to the deposited powder layer prior to a compaction process. The application of the wetting agent improves the flowability of the powder resulting in uniform compaction. The application of the wetting agent also prevents powder from sticking to the Mylar cover layer of a compaction roller. In one implementation, water is used as the wetting agent and is applied at a wetting station inside a water steam chamber. The wetting process may be controlled by setting the dispensing rate of the steam according to the powder layer thickness and the speed of the web movement. Various process variations including variations from the generator of the steam source, the heating elements of the steam dispensing wand, material buildup in the steam tube and nozzle, the effects of a heatsink, and atmospheric effects may cause changes in wetting quality. Therefore, there is a need to implement wetness sensors, wetting sensors or wetting agent sensors, such as moisture or humidity sensors in the wetting station allowing for real time monitoring of the wetting quality of the wetting agent absorbing material.

In addition, there is a need for wetness sensors in binder jetting 3D printing systems. In current binder jetting 3D printing systems, also known as binder jet or powder bed and inkjet or drop-on-powder printing, collectively termed herein as binder jetting 3D printing, a dry powder layer is deposited on a powder bed or a substrate followed by jetting a liquid binder onto the deposited powder layer to define the printed pattern. One of the key technical challenges of this process is to achieve a delicate balance in controlling the binder jetting by adjusting many parameters including the properties of the liquid binder such as viscosity, shear stress and shear rate, pH, surface tension, aging stability, printing droplet size, drop frequency, jet velocity, printing line width, etc. For example, when insufficient binder is applied, the powder particles cannot be joined firmly, and the printing process may fail. On the other hand, the application of excess binder may cause binder bleeding or enlargement of printed lines, thus deteriorating dimensional accuracy of the printing. The excess binder may also have complex impacts on the shrinkage, distortion, density and strength of the final printed part after post printing process, e.g., sintering.

Binder printing at high deposition rates can also lead to binder bleeding, where binder infiltration is slower than the binder delivery, thereby causing the binder to build up at the surface of the powder layer and subsequently migrate beyond the printing boundaries. Binder migration or filtration throughout the powder layer can become more difficult when the powder layer thickness increases. For this reason, multiple binder printing passes and extra waiting time between printing passes are often implemented in binder jetting 3D printing allowing the liquid binder to slowly penetrate through the entire powder layer. This significantly increases process time and thus lowers the printing throughput. Therefore, there is a need to implement wetness sensors in the binder jetting stations allowing for real time monitoring of the wetness of the powder/liquid binder mixture and thus the quality and quantity of the binder during and after application of the liquid binder to the powder.

SUMMARY OF THE INVENTION

A wetness sensor for detecting amounts of a wetting agent in a wetting agent absorbing material, including a sensor device located in contact with the wetting agent absorbing material and configured to monitor a parameter of the wetting agent absorbing material which varies in dependence on an amount of the wetting agent in the wetting agent absorbing material.

A computer system for controlling wetting of a powder layer with a wetting agent in a 3D printing process by detecting amounts of the wetting agent in a wetting agent absorbing material in a reservoir adjacent to the powder layer, including a processor and a memory coupled to the processor, configured to store executable instructions that, when executed by the processor, cause the processor to activate a wetting agent absorbing material dispenser to deposit the wetting agent absorbing material in the reservoir, wherein the wetting agent absorbing material has an absorption rate for the wetting agent corresponding to an absorption rate of the powder layer for the wetting agent, activate a wetting agent dispenser above the reservoir to apply the wetting agent to the deposited wetting agent absorbing material, monitor an output from a sensor device embedded in the wetting agent absorbing material, wherein the sensor device is configured to monitor a parameter of the wetting agent absorbing material which varies in dependence on an amount of the wetting agent in the wetting agent absorbing material, and control an amount of the wetting agent applied to the powder layer based on the output from the sensor device.

A method for controlling amounts of a wetting agent in a powder being processed in a 3D printing operation, including activating a powder dispenser to deposit the powder on a substrate, activating a wetting agent dispenser to apply a wetting agent to the deposited powder, monitoring an output from a sensor device embedded in the powder to determine an amount of the wetting agent in the powder, wherein the sensor device is configured to monitor a parameter of the powder which varies in dependence on an amount of the wetting agent in the powder, and controlling the wetting agent dispenser to control the amount of wetting agent in the powder based on the output of the sensor device.

A method for controlling dryness of a powder being processed in a 3D printing operation, including activating a heating element located in contact with a powder to heat the powder following receiving a measurement of the amount of wetting agent in the powder from the output of a sensor device embedded in the powder, to dry the powder, determining, via the sensor device, if the powder has reached a predetermined amount of dryness, and controlling the heating element to control the amount of heat applied to the powder based on the output of the sensor device.

A computer system for controlling wetting of a powder layer with a wetting agent in a 3D printing process by detecting amounts of the wetting agent in the powder layer, including a processor and a memory coupled to the processor, configured to store executable instructions that, when executed by the processor, cause the processor to activate a powder dispenser to deposit the powder on a substrate to form the powder layer, activate a wetting agent dispenser to apply the wetting agent to the deposited powder layer, monitor an output from a sensor device embedded in the powder layer, wherein the sensor device is configured to monitor a parameter of the powder layer which varies in dependence on an amount of the wetting agent in the powder layer, and control an amount of the wetting agent applied to the powder layer based on the output from the sensor device.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
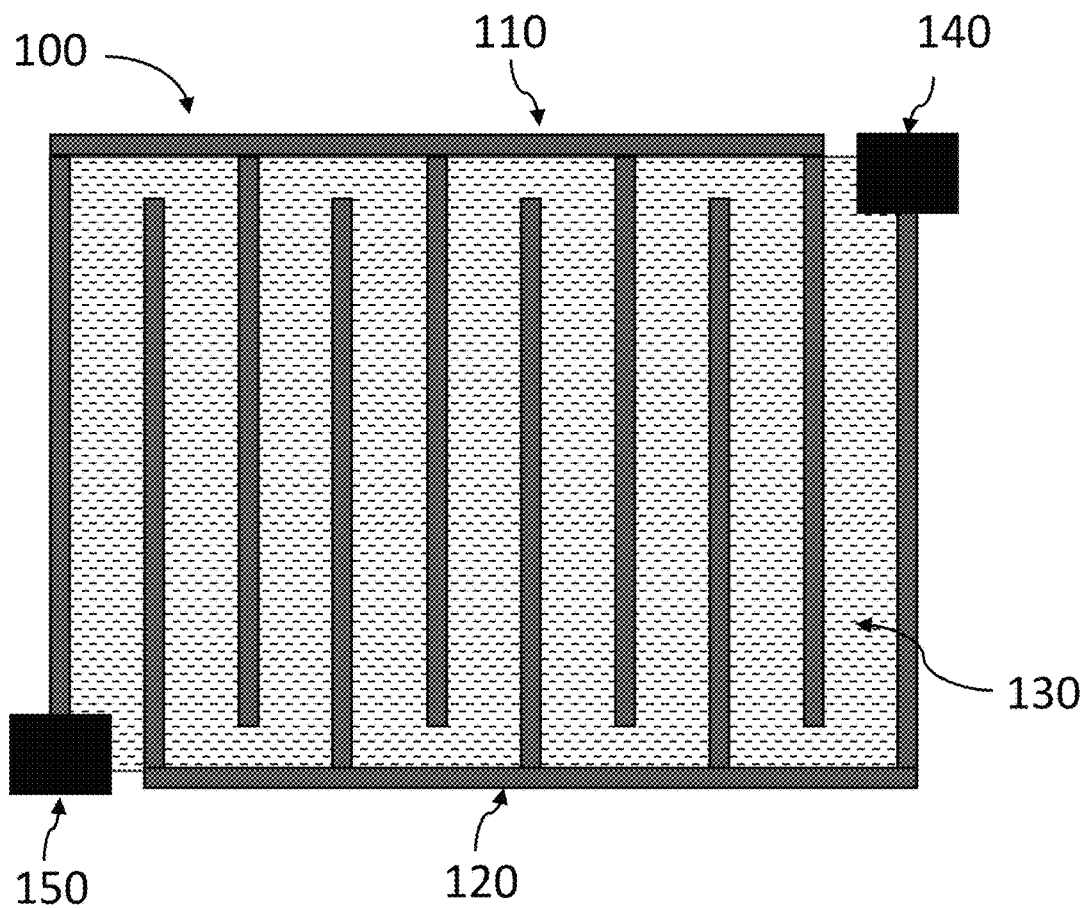
FIG. 1 shows a wetting sensor cell including a pair of interdigitated electrodes with a wetting agent absorbing material (e.g., a powder) deposited on top of the two electrodes, and electrode terminals for connecting to an electronic measurement system, in accordance with aspects of the present disclosure.

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

This disclosure pertains to an improved wetness sensor, wetting sensor or wetting agent sensor, and a method and system for using such a sensor to sense an amount of a wetting agent in, for example, a wetting agent absorbing material. The present disclosure broadly encompasses sensors and their use in many applications, including but not limited to monitoring and quality control of processes of lubrication, wetting, drying and deposition/removal of liquid-based materials. In particular, the present disclosure relates to a 3-D printing system comprising sensors for wetting agents in wetting agent absorbing materials which have absorption rates for the wetting agents corresponding with absorption rates for the wetting agents in powder layers being processed by the 3-D printing system. This permits controlling wetting of the powder layer being processed by the 3D printing system based on outputs of the sensors in the wetting agent absorption material. To this end, the wetting agent absorption material can be a powder identical to the powder used in the powder layer, or a different powder or a different type of material from that used in the powder layer, as long as absorption rates of the wetting agent absorption material for the wetting agents have a known relationship with absorption rates of the powder layer being processed in the 3D printing system. These sensors enable automated in-line monitors to detect quality issues related to wetting, drying and deposition/removal of wetting agents such as steam, liquid binders and inkjet materials in real time, thus minimizing production of defective parts. Various types of sensors including optical, gravimetric, capacitive, resistive, piezoresistive, electrochemical, micro-electro-mechanical-system and field-effect-transistor sensors may be used.

In particular, as discussed below, in accordance with implementations of the present disclosure, sensors are provided which, along with intelligent software, can provide instant feedback to process control when a wetting quality issue is detected (e.g., excessive wetting or insufficient wetting, both of which will adversely affect the results of the subsequent compaction operation), thus minimizing production of defective parts. Further, in accordance with other implementations of the present disclosure, real time monitoring of the liquid binder (i.e., an inkjet liquid binder) can be provided by the sensor arrangements described herein, which is an important aspect of properly controlling the amount of liquid binder applied in binder jetting 3D printing as well.

Referring to FIG. 1, in some implementations of the present disclosure, a wetting sensor device (i.e., a sensor for a wetting agent such as steam, water, liquid binder or inkjet materials in a powder) operates by employing a sensor cell 100, wherein a wetting agent absorbing material (or sensing material or sensing medium) absorbs a wetting agent forming a wetting agent absorbing material/wetting agent mixture, which interacts with sensing electrodes and generates an electrical sensing signal that is proportional to the concentration of the wetting agent absorbed in the wetting agent absorbing material. In some embodiments, the wetting sensor device can be, for example, a resistive or conductive type of sensor. The wetting agent absorbing material can comprise inorganic and/or organic functional materials, e.g., metals, ceramics and polymers, or combinations thereof. In one example, the wetting agent absorbing material can be the same material as a powder being processed in a 3D additive manufacturing operation. The wetting agent absorbing material may further comprise additives such as an electrolyte, salt, or other material to enhance the sensing signal. The electrical sensing signal generated by the sensor can be measured as a current, voltage, charge, potential, conductivity, or impedance.

As illustrated in the example shown in FIG. 1, a sensor cell 100 comprises a pair of interdigitated electrodes 110 and 120, a wetting agent absorbing material 130 (e.g., a powder) deposited on top of the two electrodes 110 and 120, and electrode terminals 140 and 150 for connecting to an electronic measurement system (not shown), such as a voltage, current and impedance reader. The use of a pair of interdigitated electrodes is solely for purposes of example, other electrode configurations, such as other electrode shapes, structures or arrangements, a three-electrode configuration with a reference electrode or a four-electrode configuration for decoupling current and voltage measurements may also serve this function. The wetting sensor device may also comprise a processor for processing the electrical signal and determining a quantity/concentration of the wetting agent based on analysis of a series of one or more measurements.

Figure 2:
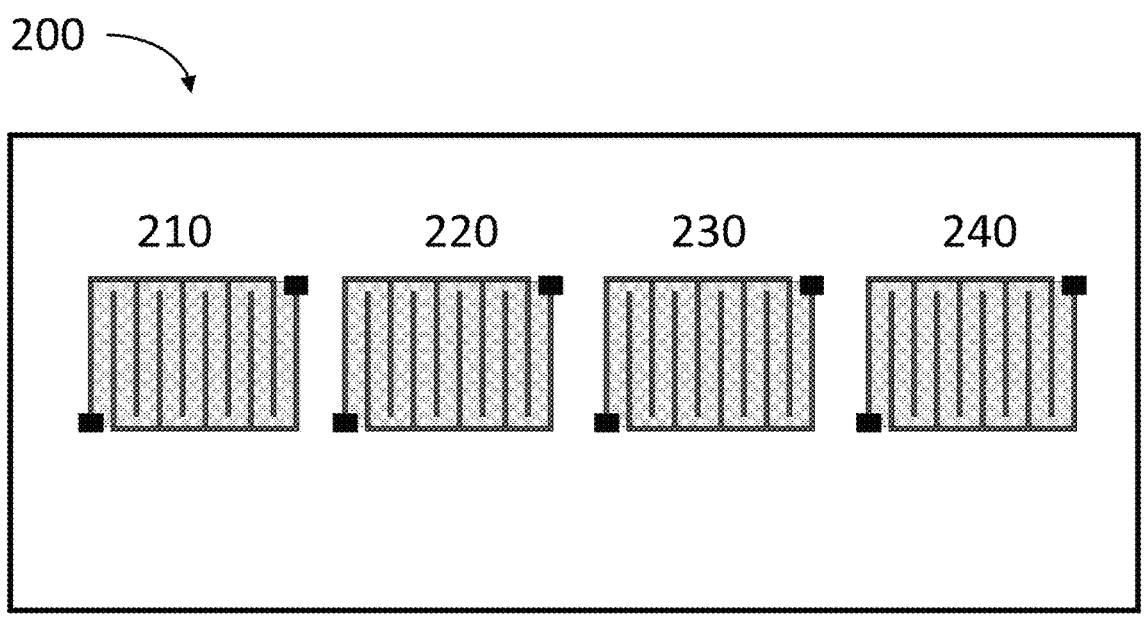
FIG. 2 shows a wetting sensor having a plurality of sensor cells, in accordance with aspects of the present disclosure.

In some implementations, as illustrated in FIG. 2, a wetting sensor 200 comprises a plurality of sensor cells 210, 220, 230 and 240, wherein each sensor cell comprises one or more pairs of sensing electrodes, for example pairs of interdigitated electrodes, and a wetting agent absorbing material (e.g., a powder) deposited on top of the sensing electrodes, as shown in FIG. 1. The sensing electrodes exhibit a wetting agent induced change in electrical signal or properties upon absorption of the wetting agent in the wetting agent absorbing material (e.g. a powder) forming a wetting agent absorbing material/wetting agent mixture.

It is noted that an advantage of providing multiple sensor cells (as illustrated in FIG. 2) is that they can be used to determine wetness at different portions, locations, levels or depths of a powder layer being processed. As such, multiple sensor cells can monitor a rate of permeation of a wetting agent through the powder and can ensure that the entire powder layer is permeated. Also, by using multiple sensor cells, one or more of the sensor cells can be located in one reservoir that is currently being subjected to a process of drying the wetting agent absorbing material for example, by heating, after the wetting agent absorbing material in that particular reservoir has been used for testing wetness in a layer of powder that has already been processed, while sensor cells located in a different reservoir are monitoring a new layer of powder that is currently being processed. This allows the wetting agent absorbing material in the first reservoir to be regenerated and reused for further testing of wetness in another powder layer which will subsequently be wetted.

A further advantage of the present disclosure is that real-time or dynamic modification of the wetting or drying conditions within a process, for example a 3D printing process, can be carried out both during and between the processing of the various layers by employing a wetness sensor. In some implementations, if an electrical property measured by the wetness sensor at a particular level in the powder is lower (or higher) than expected, this is an indication that the wetting agent has not permeated to that depth, and more wetting agent may need to be applied, or the time for which wetting agent is applied may need to be increased. Similarly, if a measured electrical property in the powder at a specific location is higher (or lower) than expected, this is an indication that too much wetting agent has been applied, or it is being applied for too long, and drying and removal of the excess wetting agent in the powder may be performed.

For example, when a conductive type of wetness sensor is used, the measured electrical property is a conductance or conductivity which value increases with the increase of the concentration of the wetting agent absorbed in the powder. Thus, if the measured conductance or conductivity at a specific depth or location of the powder is lower than a predetermined value corresponding to a target wetness for the wetting agent, this indicates that the amount of the wetting agent at the specific depth or location is insufficient, and more wetting agent needs to be applied, or the time for which wetting agent is applied needs to be increased. Conversely, if the measured conductance or conductivity at a specific depth or location of the powder is higher than a predetermined value corresponding to a target wetness for the wetting agent, this indicates that the amount of the wetting agent at the specific depth or location is excessive, and the amount of wetting applied needs to be reduced, or the time for which wetting agent is applied needs to be decreased. In another example, when a resistive type of wetness sensor is used, the measured electrical property is a resistance or resistivity which value decreases with the increase of the concentration of the wetting agent absorbed in the powder. Thus, if the measured resistance or resistivity at a specific depth or location of the powder is higher than a predetermined value corresponding to a target wetness for the wetting agent, this indicates that the amount of the wetting agent at the specific depth or location is insufficient, and more wetting agent needs to be applied, or the time for which wetting agent is applied needs to be increased. Conversely, if the measured resistance or resistivity at a specific depth or location of the powder is lower than a predetermined value corresponding to a target wetness for the wetting agent, this indicates that the amount of the wetting agent at the specific depth or location is excessive, and the amount of wetting applied needs to be reduced, or the time for which wetting agent is applied needs to be decreased.

Figure 3:
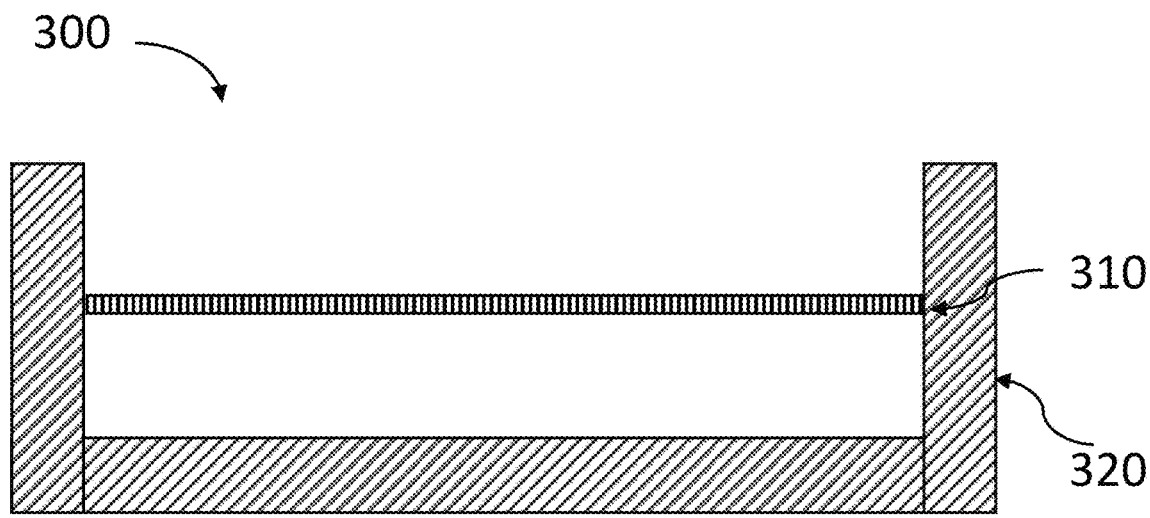
FIG. 3 shows a wetting sensor comprising one or more sensor cells mounted in a reservoir to contain a wetting agent absorbing material, in accordance with aspects of the present disclosure.

In some implementations, as illustrated in FIG. 3, a wetting sensor 300 comprises one or more sensor cells 310 (e.g., such as the sensor cells of FIG. 1), wherein each cell comprises one or more sensing electrodes, for example a pair of interdigitated electrodes, and a reservoir 320 configured to contain a wetting agent absorbing material (e.g., a powder) which can induce a change in electrical signals between the two electrodes of each pair of sensing electrodes upon exposure to the wetting agent, wherein the wetting agent absorbing material and the wetting agent form a mixture, such as a powder/wetting agent mixture. The sensing electrodes are located at a specific vertical location to measure concentration of a wetting agent at a specific depth of the wetting agent absorbing material, providing monitoring of the wetness of a powder layer being processed, such as a powder layer being processed in a 3D additive manufacturing operation.

Figure 4:
FIG. 4 shows a wetting sensor in a reservoir, with a heating element to enable drying and removal of the wetting agent in a wetting agent absorbing material, in accordance with aspects of the present disclosure.

In other implementations, as illustrated in FIG. 4, a wetting sensor 400 comprises one or more sensor cells 410 (which can be similar to those shown in FIG. 1), wherein each sensor cell comprises one or more sensing electrodes, for example pairs of interdigitated electrodes, and a reservoir 420 configured to contain a wetting agent absorbing material (e.g., a powder) which can induce a change in electrical signals between the two electrodes of each pair of sensing electrodes upon exposure to the wetting agent, wherein the wetting agent absorbing material and the wetting agent form a mixture, such as a powder/wetting agent mixture. The wetting sensor 400 of FIG. 4 may also comprise one or more heating elements 430 located at the bottom of the reservoir 420, or, alternatively or additionally, on sidewalls of the reservoir 420. The one or more heating elements 430 enable drying and removal of the wetting agent from the wetting agent absorbing material so that the wetting sensor 400 can be reset to a state corresponding to a concentration of zero for the wetting agent (or a predetermined minimum concentration suitable for beginning a remeasuring process). This allows the wetting agent absorbing material to be regenerated and reused for testing of wetness in powder layers which will subsequently be wetted.

Figure 5:
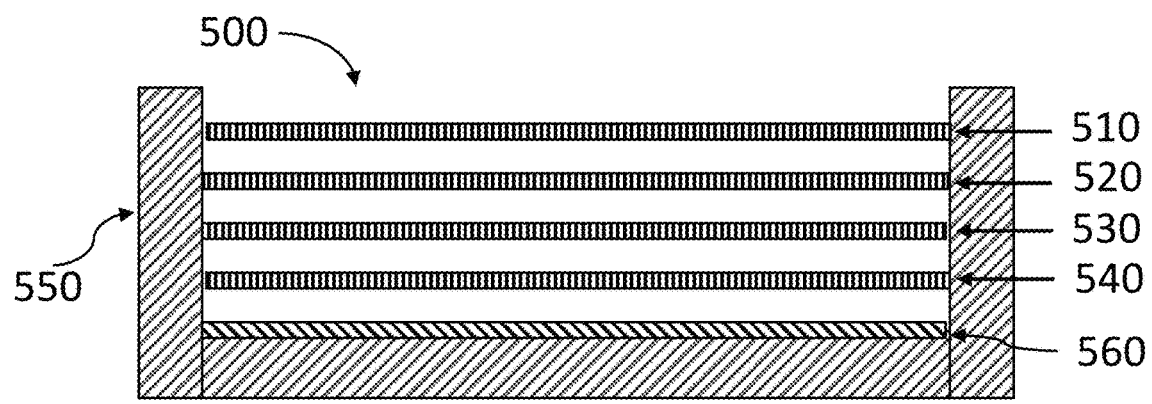
FIG. 5 shows a wetting sensor comprising a plurality of sensor cells mounted in a reservoir at different levels/heights, with a heating element to enable drying and removal of the wetting agent in a wetting agent absorbing material, in accordance with aspects of the present disclosure.

In other implementations, as illustrated in FIG. 5, a wetting sensor 500 includes a plurality of sensor cells 510 to 540 (such as the sensor cells shown in FIG. 1), wherein each cell comprises one or more sensing electrodes, for example pairs of interdigitated electrodes, and a reservoir 550 configured to contain a wetting agent absorbing material (e.g., a powder) which can induce a change in electrical signals between the two electrodes of each pair of sensing electrodes upon exposure to the wetting agent, wherein the wetting agent absorbing material and the wetting agent form a mixture, such as a powder/wetting agent mixture. The plurality of sensor cells 510 to 540 comprising one or more pairs of sensing electrodes are configured to be located at various vertical locations of the reservoir to enable measurement of a concentration of a wetting agent at different depths of the wetting agent absorbing material. The wetting sensor 500 may also comprise one or more heating elements 560 located at the bottom and or sidewalls of the reservoir 550. The one or more heating elements 560 enable drying and removal of the wetting agent from the wetting agent absorbing material so that the wetting sensor 500 can be reset to a state corresponding to a concentration of zero for the wetting agent (or a predetermined minimum concentration suitable for beginning a remeasuring process). This allows the wetting agent absorbing material to be regenerated and reused for testing of wetness in powder layers which will subsequently be wetted.

Figure 6:
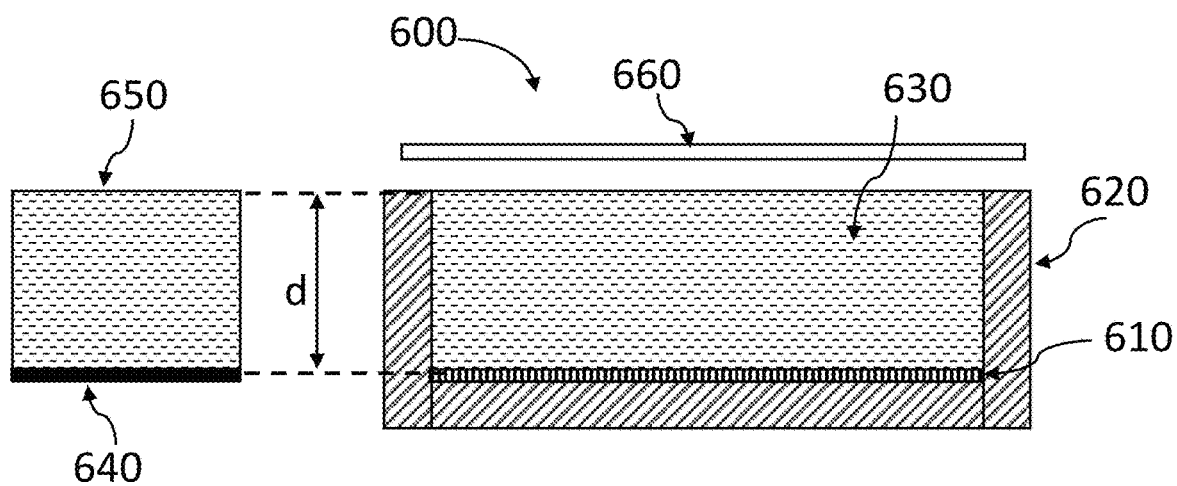
FIG. 6 shows an arrangement in which a wetting sensor comprising one or more sensor cells in a reservoir containing a wetting agent absorbing material (e.g. the same powder used in 3D printing operation), is located adjacent to a powder dispensing arrangement of a 3D printing system, in accordance with aspects of the present disclosure.

In another implementation, as illustrated in FIG. 6, a wetting sensor 600 comprises one or more sensor cells 610 (such as the sensor cells shown in FIG. 1), wherein each sensor cell comprises one or more pairs of sensing electrodes, for example pairs of interdigitated electrodes, and a reservoir 620 configured to contain a wetting agent absorbing material (e.g., a powder) which can induce a change in electrical signals between the two electrodes of each pair of sensing electrodes upon exposure to the wetting agent, wherein the wetting agent absorbing material and the wetting agent form a wetting agent absorbing material/wetting agent mixture, such as a powder/wetting agent mixture. In FIG. 6, only one sensor cell is shown, but a plurality of sensor cells, such as shown in FIG. 5, could be employed. For each sensor cell, the same powder used for a 3D printing operation is added to the reservoir 620 forming powder layer 630 to cover the sensing electrodes of the sensor cell 610, wherein the sensor cell 610 and thus the sensing electrodes are configured to be located at the same depth d of the powder layer 650 printed on a web substrate 640. It is noted that the powder can be added to the reservoir 620 simultaneously with the powder layer 650 being deposited on the web substrate 640, or the reservoir 620 can be prefilled with the powder to the depth, which will correspond to the intended depth d of the powder layer 650 on the web substrate 640. If desired, the reservoir 620 can be prefilled with a wetting agent absorbing material such as a powder, which is different from the powder used for the 3D printing operation.

During a wetting operation, the sensor cell is exposed to a wetting agent and produces an electrical signal to indicate if the wetting agent in the powder has permeated the entire powder layer 630 and the amount of the wetting agent applied meets the specification of an acceptable range. If the wetness (corresponding to an electrical signal) measured by the wetting sensor 600 is below the acceptable range, this information can be used to dictate that more wetting agent is required, and/or that the wetting agent needs to be provided for a longer duration. Conversely, if the wetness measured is above the acceptable range, this information can be used to dictate that less wetting agent is required, or that in future operation, the wetting agent needs to be provided for a shorter duration. This illustrates how the wetting sensor 600 is implemented to monitor wetting agent in a powder layer 650 printed on a web, thereby ensuring the wetting agent has permeated the entire powder layer.

As noted above, FIG. 6 shows an arrangement in which the sensor 600 comprising the reservoir 620 containing the sensor cell 610 for sensing the wetness of the powder 630 (the wetting agent absorbing material) can be located adjacent to the actual powder layer 650 formed on the web substrate 640 in the printing process itself. In one aspect of the disclosure, stationary sensor devices may be located at defined locations of a printing system, for example, before and/or after a wetting station, after a compaction station, or before and/or after jetting a liquid binder etc. In another aspect, if desired, the sensor 600 comprising the reservoir 620 can travel along with the powder layer 650 on the web substrate 640 through multiple operations that the powder layer 650 is subjected to during the 3D printing operation so that the powder 630 in the reservoir 620 can be subjected to selected ones (or all) of the operations performed on the powder layer 650. FIG. 6 shows only one sensor cell 610, but it is to be understood that multiple sensor cells could be used, if desired, as shown in other embodiments such as FIG. 5. In addition, although a heating element is not shown in FIG. 6, it is also understood that one or more of such heating elements, as shown for example, in FIG. 5, could also be used on the bottom and/or the sidewalls of the reservoir 620 in the implementation of FIG. 6.

Still referring to FIG. 6, the reservoir 620 can be filled with powder 630 and at the same time the powder 650 is actually dispensed on the web substrate 640, adjacent to the reservoir 620, in the actual 3D printing process. After the 3D printing process for the particular powder layer 650 on the web substrate 640 is completed, the reservoir 620 can be emptied of the powder 630 (i.e. the wetting agent absorbing material) mixed with the wetting agent, and then refilled with new powder free from the wetting agent at the same time the next powder layer 650 is deposited on the web substrate 640. This emptying operation could be accomplished, for example, by removing the reservoir and inverting it to allow the powder to fall out, or by removing the bottom of the reservoir for the powder to fall out, or by suctioning out the powder.

However, as also discussed above, the powder 630 in the reservoir 620 can also be reused, if desired, to avoid extra steps of emptying the powder from the reservoir and replacing it, by using a heating element to remove the wetting agent in the powder and dry the powder in the reservoir between printing operations for successive printing of powder layers 650 on the web substrate 640 adjacent to the reservoir 620. In this case, an optional cover 660 located above a top open area of the reservoir 620, as shown in FIG. 6, can be temporarily put into place to cover the top of the reservoir 620 to prevent any new powder being deposited on the substrate 640) from entering the reservoir 620. Also, if desired, the cover 660 could be placed to seal off or partially close the top opening of the reservoir 620 during the heating of the powder 630 with the heating element to hasten the heating/drying process between successive powder deposition operations on the web substrate 640 so that the powder 630 in the reservoir 620 can be reused for successive printing operations without unduly slowing down the actual printing operations. Still further, the cover 660 could be selectively put into place to cover the powder 630 in the reservoir 620 to protect it, if desired, from certain operations which the powder layer 650 is subjected to but it is unnecessary to subject the powder 630 in the reservoir 620 to these operations. This is particularly useful when the reservoir 620 is filled with a wetting agent absorbing material such as a powder, which is different from the powder used for the 3D printing operation.

Figure 7:
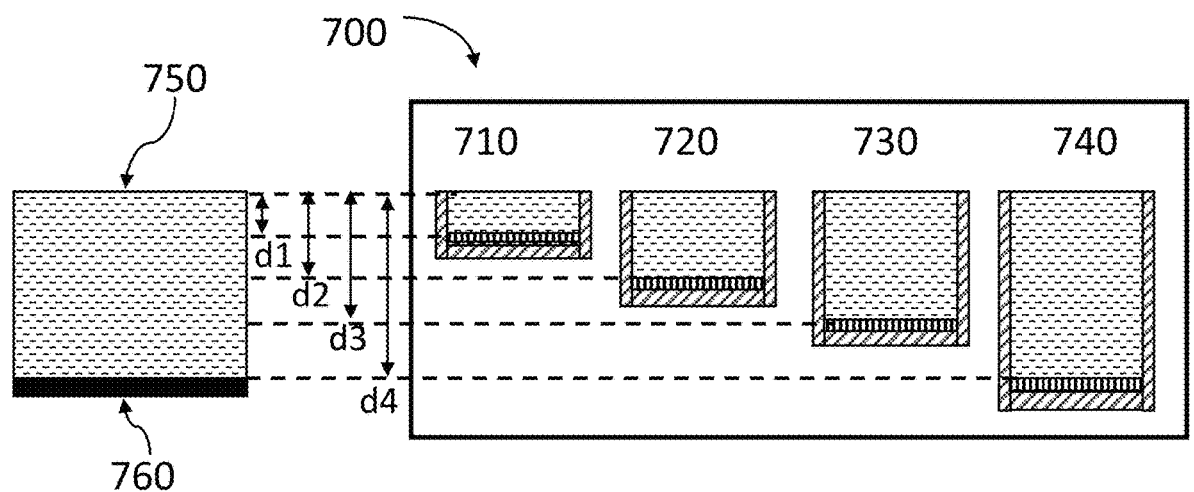
FIG. 7 shows an arrangement in which a wetting sensor comprises a plurality of sensor cells, with each sensor cell contained in a reservoir at a different height so that different levels of permeation of powder by a wetting agent can be monitored, in accordance with aspects of the present disclosure.

In another implementation, as illustrated in FIG. 7, a wetting sensor 700 comprises a plurality of sensor cells 710 to 740, wherein each sensor cell comprises one or more sensing electrodes, for example a pair of interdigitated electrodes (such as the electrodes shown in FIG. 1) and a reservoir (similar to the reservoirs shown in FIGS. 3-6) configured to contain a wetting agent absorbing material (e.g., a powder) which can induce a change in electrical signal between the two electrodes of each set of the sensing electrodes upon exposure to the wetting agent, wherein the wetting agent absorbing material and the wetting agent form a mixture, such as a powder/wetting agent mixture. For each of the plurality of sensor cells 710-740, the same powder used for an actual 3D printing operation is added to the reservoir to cover the sensing electrodes of the sensor cells located in the reservoir, wherein the sensing electrodes are configured to be located at different depths d1 to d4 corresponding to a powder layer 750 printed on a web substrate 760. Alternatively, each reservoir of the plurality of sensor cells 710-740 is filled with a wetting agent absorbing material such as a powder, which is different from the powder used for the 3D printing operation.

During wetting operations, each of the sensor cells 710-740 is exposed to a wetting agent in the powder (i.e. the wetting agent absorbing material) located in the particular reservoir and produces an electrical signal to indicate if the wetting agent has permeated the powder layer in the reservoir to the depth that each sensor cell is configured for. The plurality of sensor cells 710-740 are configured for detecting wetting agent at various depths d1 to d4 of the powder layer in the reservoir and produce electrical signals to indicate the permeating rate of the wetting agent through the thickness of the powder layer 750 printed on the web substrate 760. The permeating rate of the wetting agent may be an average rate calculated from each wetting depth and duration measured by the sensor cells 710 to 740. The permeating rate can also be a variable rate or dynamic rate at a particular wetting duration or time, determined from a curve fit of the wetting depth as a function of the wetting duration. This information can be used for real-time or dynamic adjustment of the wetting condition of an actual 3D printing operation being carried out at the same time the sensor cells 710-740 are being exposed to the wetting agent.

To put this another way, taking the example shown in FIG. 7 (which indicates four sensor cells 710-740, solely for purposes of example, noting that any number of sensor cells could be used), each of the individual sensor cells 710-740 will indicate when the wetting agent has permeated the powder layer to a predetermined depth d1 to d4. In other words, the sensing electrodes in the sensor cell 710 will indicate permeation of the wetting agent in the powder layer to the depth d1 before any of the sensing electrodes in the sensor cells 720-740 since the depth d1 of the powder layer in the sensor cell 710 is less than the depths d2 to d4 of the powder layers in the other sensor cells 720-740. In this way, it can be determined when the wetting agent has permeated to different depths of the powder in each sensor cell, thereby giving an indication of the rate of permeation of the wetting agent in the powder 750 in an actual 3D printing operation taking place on a web substrate 760 adjacent to the sensor cells 710-740. It is noted that the individual reservoirs can each be prefilled with a powder to a predetermined different depth corresponding to different depths d1 to d4 within the actual powder layer 750) being deposited on a web substrate 760, as shown in FIG. 7. If desired, the individual reservoirs can each be filled with a powder to a predetermined depth simultaneously with the powder layer 750 being deposited on the web substrate 760.

Figure 8:
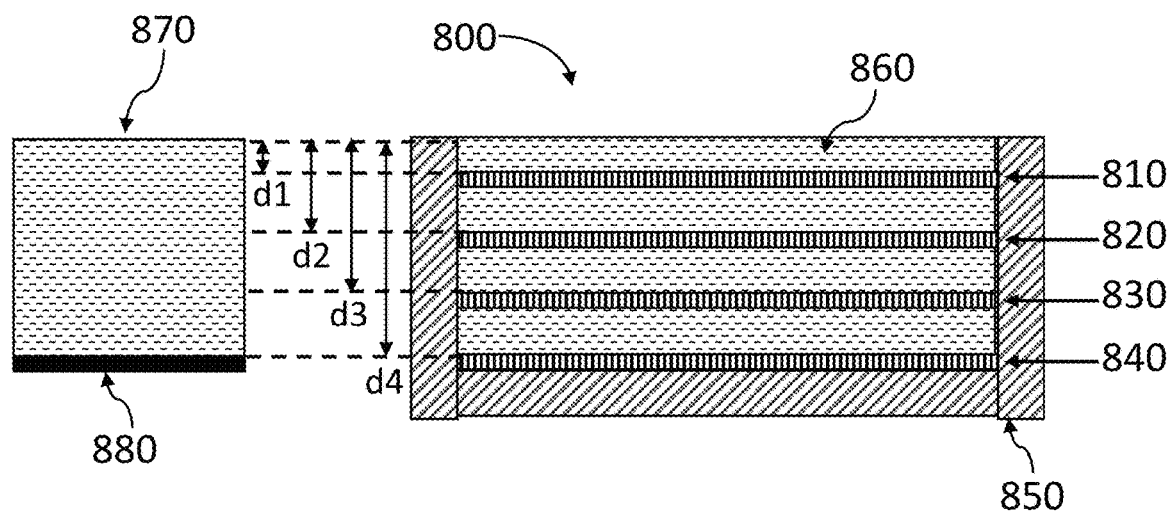
FIG. 8 shows an arrangement in which a wetting sensor comprises a plurality of sensor cells mounted in a reservoir to monitor different levels of permeation of powder by a wetting agent, in accordance with aspects of the present disclosure.

In another implementation, as illustrated in FIG. 8, a wetting sensor 800 comprises a plurality of sensor cells 810 to 840 (e.g., similar to the sensor cells shown in FIG. 1), wherein each cell comprises one or more sensing electrodes, for example pairs of interdigitated electrodes, and a reservoir 850 configured to contain a wetting agent absorbing material (e.g., a powder) which can induce a change in electrical signals between the two electrodes of each pair of sensing electrodes upon exposure to the wetting agent, wherein the wetting agent absorbing material and the wetting agent form a mixture, such as a powder/wetting agent mixture. The plurality of sensor cells 810 to 840 are configured to be located at various vertical locations of the reservoir 850 to enable measurement of a concentration of a wetting agent at different depths of the wetting agent absorbing material. For each of the plurality of sensor cells 810-840, the same powder used for an actual 3D printing operation is added to the reservoir 850 forming powder layer 860 to cover the sensing electrodes of the sensor cells located in the reservoir 850, wherein the sensor cells and thus the sensing electrodes are configured to be located at different depths d1 to d4 corresponding to a powder layer 870 printed on a web substrate 880. Alternatively, the reservoir 850 may be filled with a wetting agent absorbing material such as a powder, which is different from the powder used for the 3D printing operation.

During wetting operations, each of the sensor cells 810-840 is exposed to a wetting agent in the powder (i.e. the wetting agent absorbing material) located in the reservoir and produces an electrical signal to indicate if the wetting agent has permeated the powder layer in the reservoir to the depth that each sensor cell is configured for. The plurality of sensor cells 810-840 are configured for detecting wetting agent at various depths d1 to d4 of the powder layer 860 in the reservoir 850 and produce electrical signals to indicate the permeating rate of the wetting agent through the thickness of the powder layer 870 printed on the web substrate 880, thus allowing for real-time or dynamic adjustment of the wetting condition of an actual 3D printing operation being carried out at the same time the sensor cells 810-840 are being exposed to the wetting agent.

Figure 9:
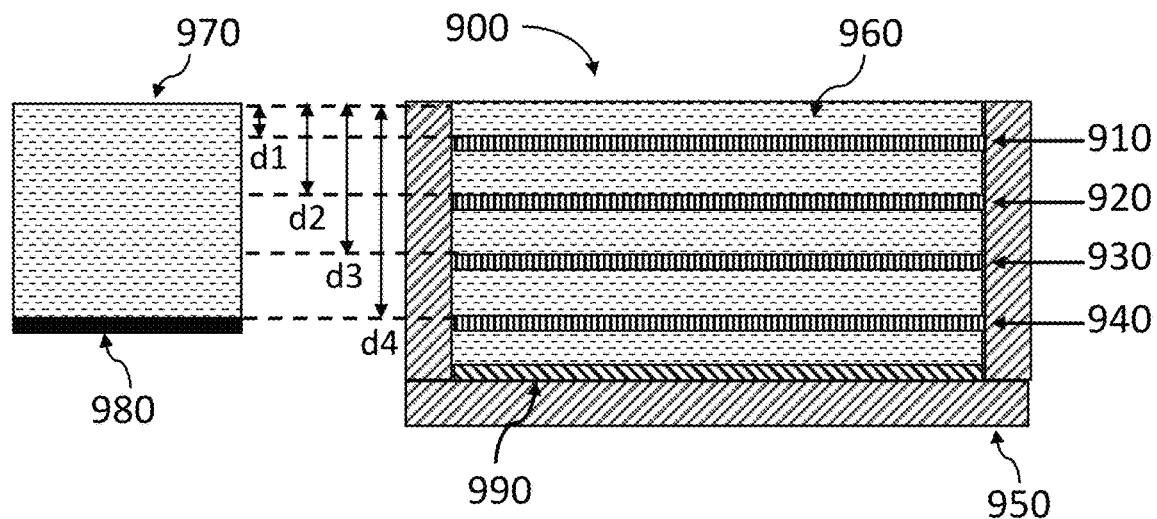
FIG. 9 shows an arrangement in which a wetting sensor comprises a plurality of wetting sensor cells mounted in a reservoir to monitor different levels of permeation of powder by a wetting agent, with a heating element to enable drying and removal of the wetting agent absorbed in a wetting agent absorbing material, in accordance with aspects of the present disclosure.

In another implementation, as illustrated in FIG. 9, which is a further variation of the implementation of FIG. 8, a wetting sensor 900 comprises one or more sensor cells 910 to 940 (such as the sensor cells shown in FIG. 1), wherein each sensor cell comprises a plurality of sensing electrodes, for example pairs of interdigitated electrodes, and a reservoir 950) configured to contain a wetting agent absorbing material (e.g., a powder 960) which can induce a change in electrical signals between the two electrodes of each pair of sensing electrodes upon exposure to the wetting agent, wherein the wetting agent absorbing material and the wetting agent form a mixture, such as a powder/wetting agent mixture. The wetting sensor 900 may also comprise one or more heating elements 990 located at the bottom and/or sidewalls of the reservoir 950, wherein the heating elements 990 enable drying and removal of the wetting agent from the powder 960 (the wetting agent absorbing material) so the sensor 900 can be reset to a state corresponding to concentration of zero (or another predetermined concentration) for the wetting agent, allowing for monitoring repeated wetting and/or drying cycles.

Any one of the implementations shown in FIGS. 1-9 can be utilized as a moisture sensor comprised of a plurality of sensor cells, wherein each sensor cell comprises one or more sensing electrodes configured for detecting water (as a wetting agent) at various depths of a water absorbing material (i.e. the wetting agent absorbing material, such as a powder) and a reservoir configured to contain the water absorbing material which can induce a change in electrical signals between the two electrodes of each pair of interdigitated electrodes upon exposure to the moisture, water vapor or steam. The same powder used for an actual 3D printing operation is added to the reservoir to cover the interdigitated electrodes of the sensor cells located in the reservoir. During wetting operations, each of the plurality of sensor cells is exposed to the moisture or water vapor in the powder (i.e. the wetting agent absorbing material) located in the reservoir and produces an electrical signal to indicate if the moisture has permeated the powder layer in the reservoir to the depth that each sensor cell is configured for. The plurality of sensor cells are configured for detecting moisture at various depths of the powder layer in the reservoir and produce electrical signals to indicate the permeating rate of the moisture through the thickness of the powder layer formed by the 3D printing operation, thus allowing for real-time or dynamic adjustment of the wetting condition of an actual 3D printing operation being carried out while the plurality of sensor cells are being exposed to the moisture (the wetting agent).

As discussed above for various implementations, the moisture sensor may also comprise one or more heating elements located at the bottom and/or sidewalls of the reservoir, wherein the heating elements enable drying and removal of moisture or water absorbed by the powder contained in the reservoir so the sensor can be reset to a state corresponding to concentration of zero (or another predetermined concentration) for the water, allowing for monitoring repeated wetting and/or drying cycles. This allows reuse of the powder to avoid the need to change the powder used in the reservoir for each new layer of powder being processed in the actual 3D printing operation.

Figure 10:
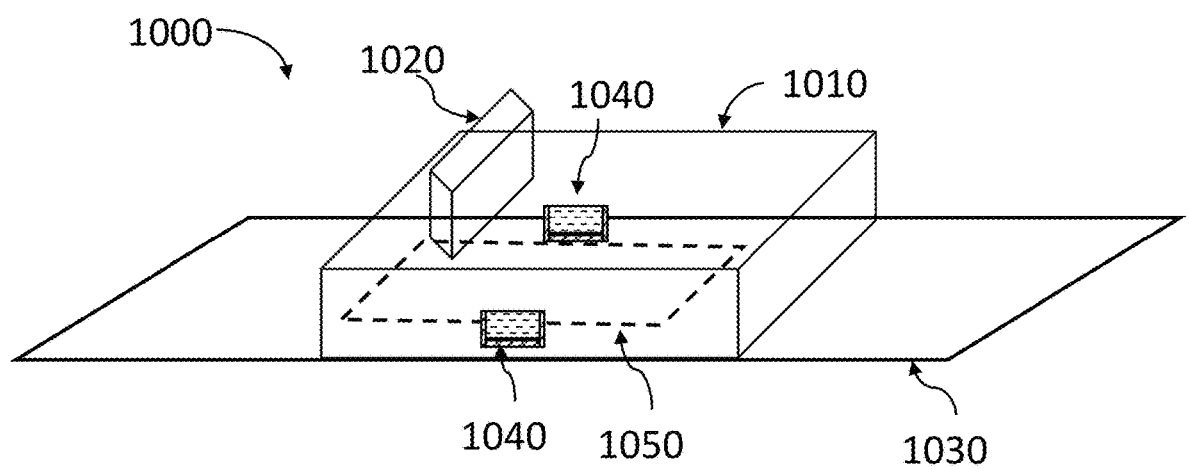
FIG. 10 shows an arrangement in which wetting sensors are incorporated into a wetting station, to enable monitoring of the wetness of a powder being processed, in accordance with aspects of the present disclosure.

In another implementation, as illustrated in FIG. 10, the moisture sensors 1040 may be implemented in a wetting station 1000 comprising a steam source 1020 in conjunction with a steam chamber 1010 which is disposed on top of a web substrate 1030. The moisture sensors 1040 may be installed inside the steam chamber 1010 adjacent to the printed powder layer 1050 deposited on the web substrate 1030 to provide real-time monitoring of the wetting process and to control the quality of the wetting by adjusting the amount of steam emitted by the steam source 1020 based on measurements made by the moisture sensors 1040. Any of the wetting sensors shown in FIGS. 1-9 can be used as the moisture sensors 1040 shown in FIG. 10. Also, a plurality of the sensors 1040 can be located at different distances from the steam source 1020) along the length of the powder layer being subjected to the steam from the steam source 1020 to ensure that the steam is permeating the entire powder layer, and to monitor the rate of permeation as the steam travels along the upper surface of the powder layer being wetted.

Figure 11:
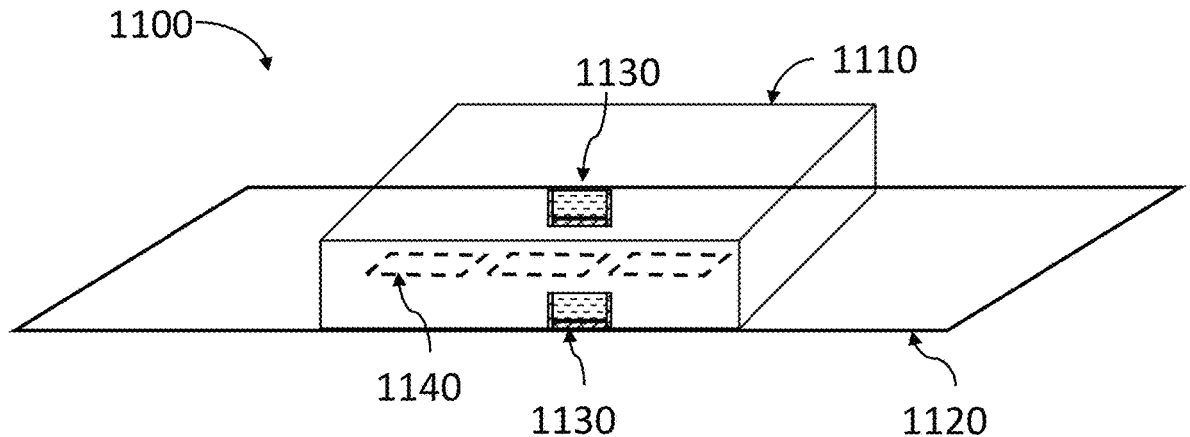
FIG. 11 shows an arrangement in which wetting sensors are incorporated into a drying station, to enable drying and removal of the wetting agent in a powder being processed, in accordance with aspects of the present disclosure.

In another implementation, as illustrated in FIG. 11, the moisture sensors 1130 may be implemented in a drying station 1100 comprising a drying chamber 1110 which is disposed on top of a conveyor 1120. The moisture sensors 1130 may be installed inside the drying chamber 1110 adjacent to the printed powder layers (printed parts) 1140 carried on the conveyer 1120 to provide real-time monitoring of the drying process and quality carried out by the drying chamber 1110. Any of the wetting sensors shown in FIGS. 1-9 can be used as the moisture sensors 1130 shown in FIG. 11. A plurality of the sensors 1130 can be located along the length of the powder layers being dried to monitor dryness (or wetness) at different locations of the powder layers, and to ensure that all powder layers (printed parts) including portions of the powder layer farthest from the actual drying sources is adequately dried.

In the implementations discussed above, the wetting agent can be liquid binder used in a binder jetting process. In this case, a wetting sensor such as shown in FIGS. 1-9, comprised of one or more sensor cells, wherein each sensor cell comprises one or more pairs of sensing electrodes, for example one or more pairs of interdigitated electrodes, configured for detecting binder at various depths and locations of a deposited powder layer, can be used to provide real-time monitoring of binder jetting process and quality.

In a further implementation, the wetting sensors of FIGS. 1-9 comprised of one or more sensor cells, wherein each cell comprises one or more pairs of sensing electrodes, for example one or more pairs of interdigitated electrodes, configured for detecting jetted liquid material at various depths and locations of a deposited layer, can provide real-time monitoring of a jetted material 3D printing process and quality. In other words, in this instance, the wetting agent is a liquid component, e.g., a liquid vehicle, a liquid carrier, a solvent, or a liquid binder of a jetted material such as an inkjet material used in a 3D printing process.

In use, incorporation of one or more sensor cells during the various wetting/drying stages within the 3D printing process described above would ultimately enable increased control of the quality of printing results, enabling a higher level of optimization, control and automation throughout the 3D printing process.

Figure 12A:
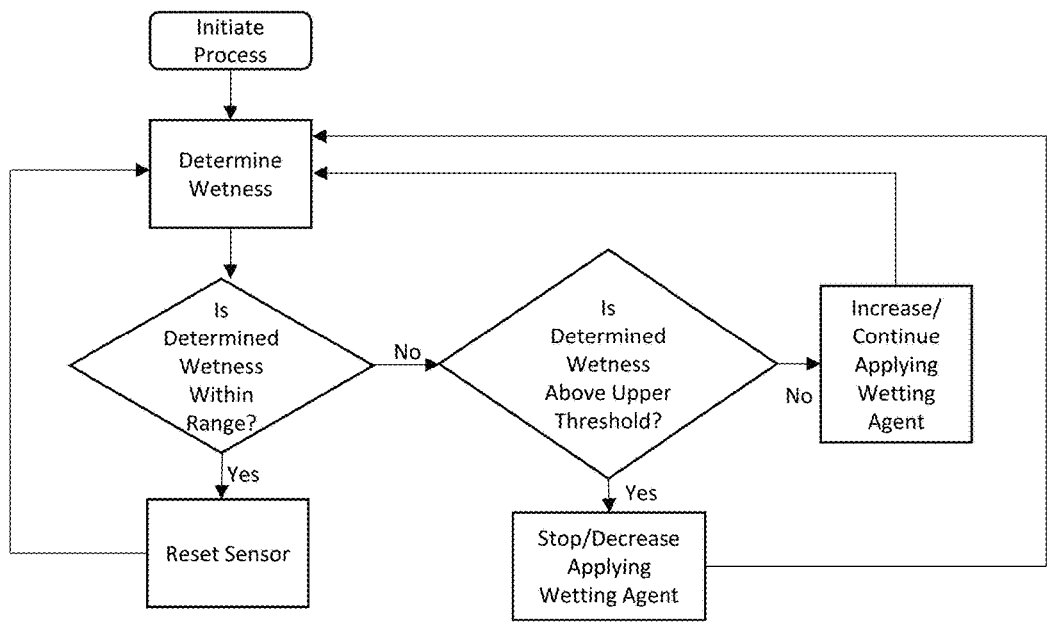
FIG. 12*a-c* illustrate basic methodologies showing how incorporation of the sensors described in FIGS. 1-11 facilitates automation and accommodation for changing conditions such as wetting process as shown in FIG. 12*a*, drying process as shown in FIG. 12*b* and binder jetting process as shown in FIG. 12*c*, enabling a resetting of conditions in preparation for the next cycle of events, in accordance with aspects of the present disclosure.
Figure 12B:
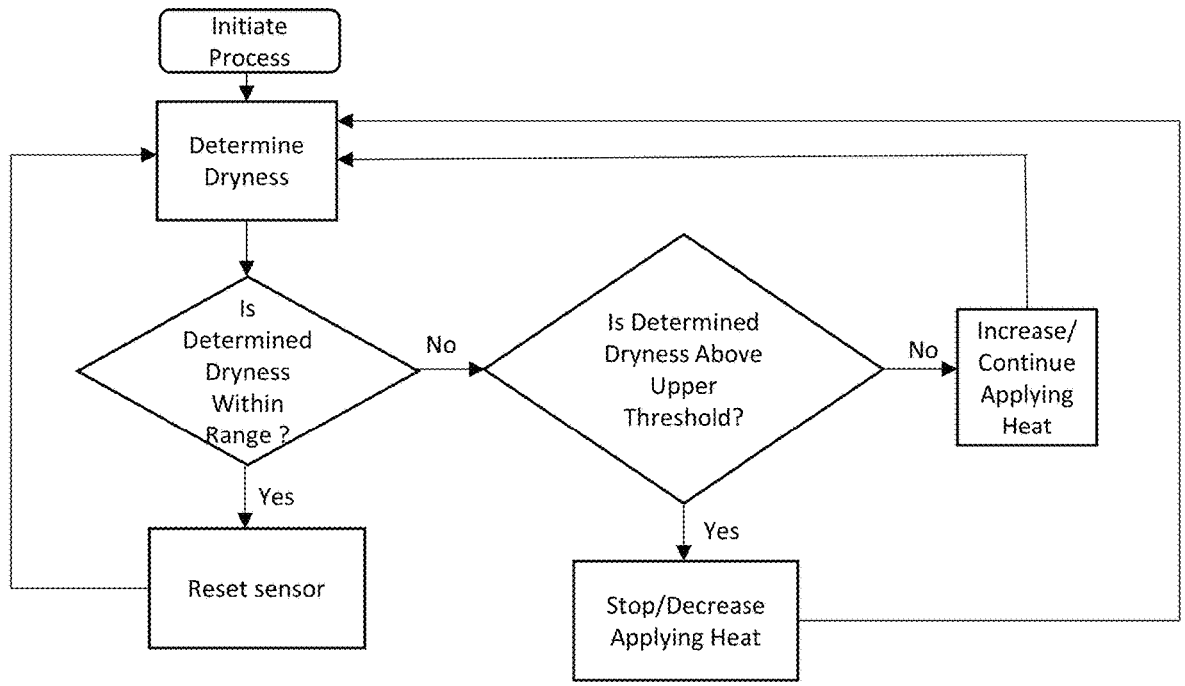
Figure 12C:
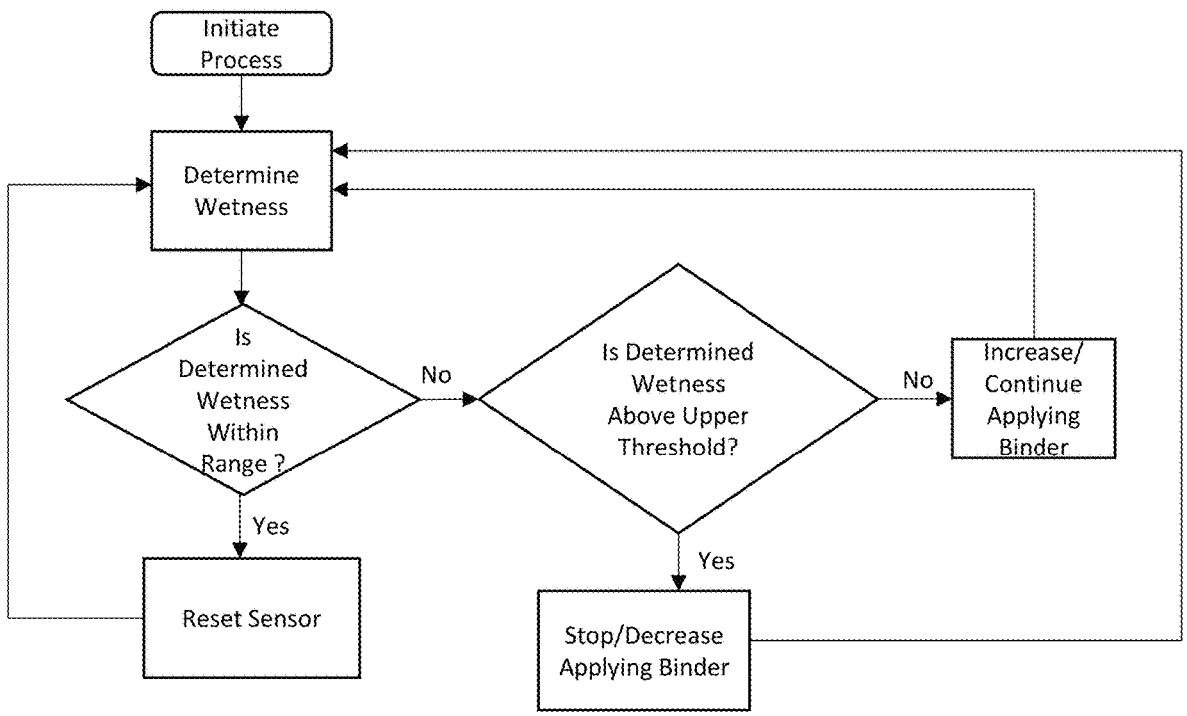

FIGS. 12a-c illustrate basic methodologies showing how incorporation of the above-described wetting sensors of FIGS. 1-11 can facilitate automation and accommodation for changing conditions in 3D printing operations such as wetting process as described in FIG. 10 and drying process as described in FIG. 11, thus enabling a resetting of conditions in preparation for the next cycle of events and allowing for continuous use of the wetting sensors to monitor repeated wetting cycles.

As shown in FIG. 12a, the wetting sensors described herein can begin a control operation by first determining wetness of a wetting agent absorption material being monitored, for example, a powder/wetting agent mixture formed upon exposure of the powder to the wetting agent, as described with regard to FIGS. 1-11 (noting that the following discussion is directed to an example where the wetting agent absorption material is a powder corresponding to the same powder used in the 3D printing process for forming a product from processed powder layer). It is noted that there is an "Initiate Process" step prior to the control operation. In this case, the "Initiate Process" step can be an operation of applying steam to the powder being used as the wetting agent absorption material to create a powder/wetting agent mixture, using, for example, a steaming arrangement such as shown in FIG. 10, as well as to apply the steam to the actual powder being used in the powder layer being processed by the 3D printing process. If the one or more wetting sensors determine that the degree of wetness of the powder/wetting agent mixture falls within a predetermined acceptable range, then it is determined that the wetting process is complete. The material being monitored and the powder layer being processed in the 3D printing process can continue to the next step of processing. The wetting sensors can then be reset, so that they are ready to be used again for a subsequent material to be monitored.

The reset of the wetting sensors can be performed by applying heat using heating elements located in the reservoirs of the wetting sensors, as shown in FIGS. 4, 5 and 9, to dry and remove the wetting agent from the powder/wetting agent mixture until such time as the mixture has reached a predetermined level or range of wetness or dryness corresponding to concentration of zero for the wetting agent or a minimum concentration range suitable for beginning a remeasuring process. This can be accomplished by a methodology of drying, detection and feedback control as described below in FIG. 12b. If the determination of wetness by the wetting sensor, prior to any drying, indicates that the wetness of the powder/wetting agent mixture does not fall within the predetermined acceptable range, then, as shown on the right side of FIG. 12a, a determination is made as to whether the degree of wetness is above or below the acceptable range. Depending on the determination, the amount of wetting agent can be increased or decreased. For example, if the wetting agent is steam, then the amount of steam generated by the steam source 1020, as shown in FIG. 10, can be increased or decreased, both with regard to the amount of steam applied to the powder/wetting agent mixture in the reservoir and to the actual powder layer being processed in the 3d printing process. In either case, once this change in wetting agent supply has been made, the wetting sensors are now ready to monitor the wetness of the subsequent material to be monitored.

In another implementation, the incorporation of one or more wetting sensors of FIGS. 1-11 may also be utilized to sense the dryness of a material, enabling, for example, a layer in a 3D printing process to be dried to a desirable level prior to moving onto the next stage of the process, as shown in FIG. 11. As illustrated in FIG. 12b, the wetting sensors described herein can begin a control operation by first determining dryness (or wetness) of a material being monitored, for example, a powder/wetting agent mixture. e.g. a printed layer of powder which has been exposed to a wetting agent and subjected to compaction. The "Initiate Process" step prior to the control operation could be an actual 3D printing process step. e.g. conditioning or compaction of the powder layer. If the one or more wetting sensors determines that the degree of dryness of the powder/wetting agent mixture falls within a predetermined acceptable range, then it is determined that the drying process is complete. The material being monitored can continue to the next step of processing such as binder jetting. The wetting sensors can then be reset, so that they are ready to be used again for a subsequent material to be monitored.

If the determination of dryness by the wetting sensor indicates that the dryness of the powder/wetting agent mixture does not fall within the predetermined acceptable range, then, as shown on the right side of FIG. 12b, a determination is made as to whether the degree of dryness is above or below the acceptable range. Depending on the determination, the amount of heat can be increased or decreased. For example, if the powder/wetting agent mixture is determined not to be sufficiently dry, more heat can be applied by increasing the heating power and/or duration. Conversely, if the mixture is determined to be sufficiently dry, application of heat can be terminated or reduced by decreasing the heating power and or duration. In either case, once this change in heating has been made, the wetting sensors are now ready to monitor the wetness of the subsequent material to be monitored.

In another implementation, the incorporation of one or more wetting sensors of FIGS. 1-11 may also be utilized to detect liquid binder at various depths and locations of a deposited powder layer, thus providing real-time monitoring of binder jetting process and quality. As illustrated in FIG. 12c, the wetting sensors described herein can begin a control operation by first determining wetness of a material being monitored, for example, a powder/wetting agent mixture. e.g. a powder/liquid binder mixture formed by powder deposition and followed by binder jetting in a 3D printing manufacturing process. In this case, the "Initiate Process" step prior to the control operation could actually be a step of binder jetting which would, itself, inject liquid into the powder to create a powder/wetting agent mixture (with the liquid binder material being the wetting agent). If the one or more wetting sensors determines that the degree of wetness of the powder/liquid binder mixture falls within a predetermined acceptable range, then it is determined that the binder jetting process is complete. The powder/binder mixture being monitored can continue to the next step of processing such as drying and/or curing.

The wetting sensors can then be reset, so that they are ready to be used again for a subsequent material to be monitored. If the determination of wetness by the wetting sensor indicates that the wetness of the powder/binder mixture does not fall within the predetermined acceptable range, then, as shown on the right side of FIG. 12c, a determination is made as to whether the degree of wetness is above or below the acceptable range. Depending on the determination, the amount of liquid binder can be increased or decreased. For example, if the powder/binder mixture is determined not to be sufficiently wet, more liquid binder can be applied. Conversely, if the powder/binder mixture is determined to be sufficiently wet, application of binder can be stopped or reduced. In either case, once this change in liquid binder supply has been made, the wetting sensors are now ready to monitor the wetness of the subsequent powder/binder mixture to be monitored.

In a further implementation, the methodology, as described in FIG. 12c, can be utilized to detect jetted material. e.g., an inkjet material at various depths and locations of a deposited layer, thus providing real-time monitoring of jetted material 3D printing process and quality. In this case, the wetting agent is a liquid component of the jetted material. e.g. a liquid vehicle, a liquid carrier, a liquid binder or a solvent. The methodologies, as described in FIGS. 12a to 12c, can be utilized to monitor processes post the jetted material printing. For example, the incorporation of one or more wetting sensors of FIGS. 1-11 may be used to measure the wetness or dryness of a printed layer of the jetted material in a liquid removal process, wherein a portion of the liquid vehicle is removed using a pressure differential or heat to form a dried layer, thus allowing for real-time or dynamic adjustment of the liquid removal condition.

It is noted that the above operations have been primarily described in terms of sensing the wetness or dryness of a powder in a reservoir which is located adjacent to actual powder being processed to provide a means of measuring the degree of wetness of the actual powder/wetting agent mixture being processed with a similar powder/wetting agent mixture in the reservoir which has been subjected to the same wetting operation as the actual powder layer being printed in a 3D printing operation (noting that the "wetting operation" can be one or more of a steaming operation, a binder jetting operation, a jetted material printing, a liquid removal operation, a drying operation, or any other wetting or drying operations that the actual powder layer being processed is subjected to). However, if desired, the wetting sensors and the sensing operations discussed herein could be used without the use of the reservoirs by placing one or more sensors in a portion of the actual powder layer being processed so that the degree of wetness could be monitored in this processed powder layer. After processing has been completed, the section with the sensors could be removed from the rest of the processed powder layer, and the sensors could be reused in the next printed powder layer operation. In other words, in this implementation an actual portion of the printed layer itself could be used for the wetness monitoring operation, and this portion could then be removed after the processing has been completed.

Figure 13:
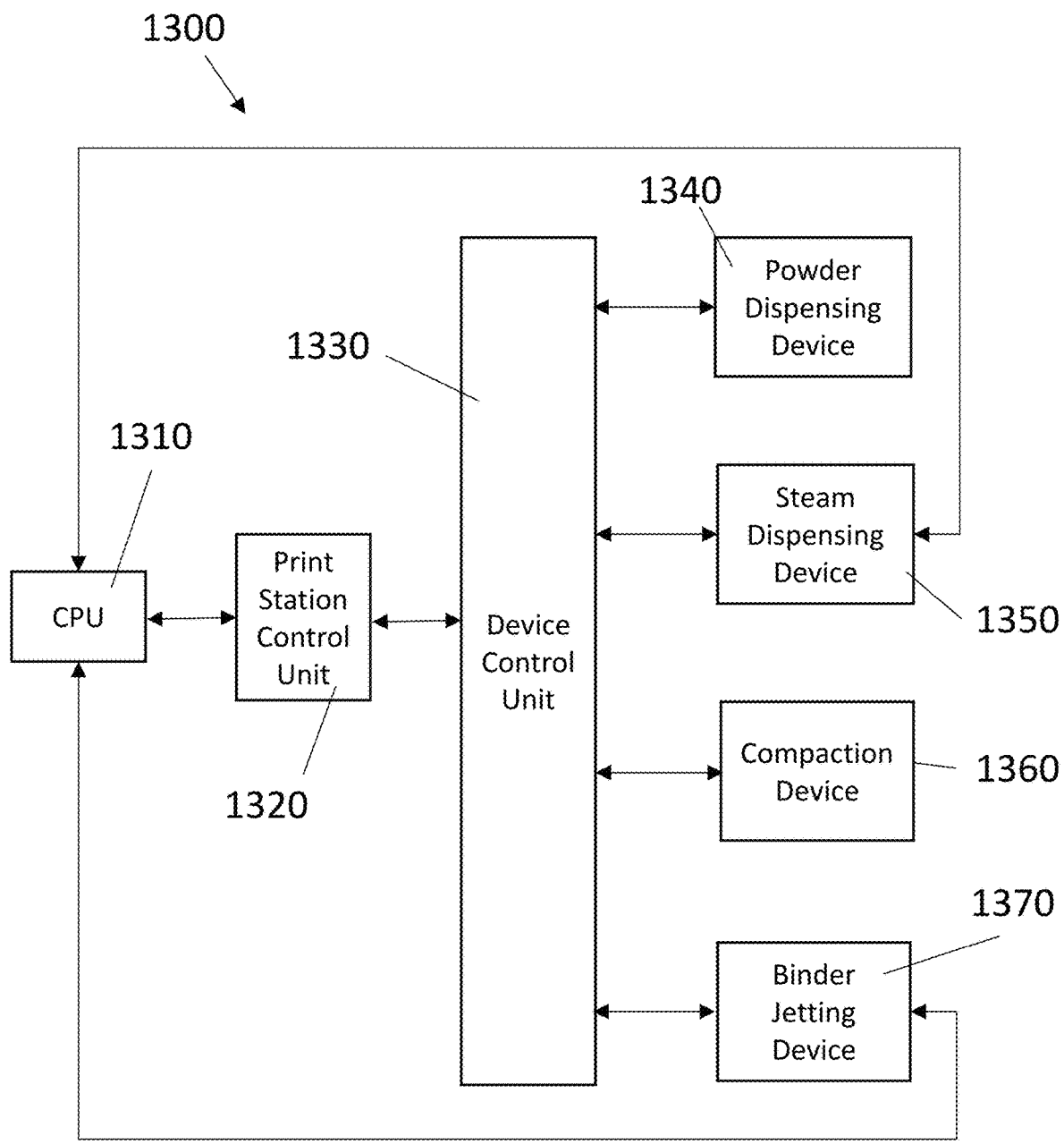
FIG. 13 shows a device control system for providing feedback control of wetting devices such as steaming devices and liquid binder jetting devices, in accordance with aspects of the present disclosure.

FIG. 13 shows a device control system 1300 for providing feedback control of wetting devices such as steaming devices, and liquid binder jetting devices, in accordance with aspects of the present disclosure. As shown in FIG. 13, a central processing unit (CPU) 1310 is connected to the components of the jetted binder printer module which can include a powder dispensing device, a steaming dispensing device, a compaction device and a binder jetting device. A print station control unit 1320 is configured to receive instructions from the CPU 1310 and direct the actions of a powder dispensing device 1340, a steam dispensing device 1350, such as the wetting station 1000 of FIG. 10, a powder compaction device 1360, and a binder jetting (printing) device 1370 through a device control unit 1330. The wetting sensors discussed above with regard to FIGS. 1-11 can be located in the steam dispensing device 1350) and/or the binder jetting printing device 1370) (with or without reservoirs, depending on the implementation being used), both of which will wet the powder dispensed by the powder dispensing device 1340. These wetting sensors can provide signals to the CPU 1310 indicating the measured degree of wetness, and the CPU 1310 can then control the steam dispensing device 1350 and the binder jetting printing device 1370 to control the amount of steam and the amount of liquid binder applied to the powder, as discussed above with reference to FIG. 12. It is also noted that, although not shown in FIG. 13, the control operations discussed above could also be used to control the operations of a drying device in the printing operation, such as the drying station 1100 shown in FIG. 11.

Figure 14:
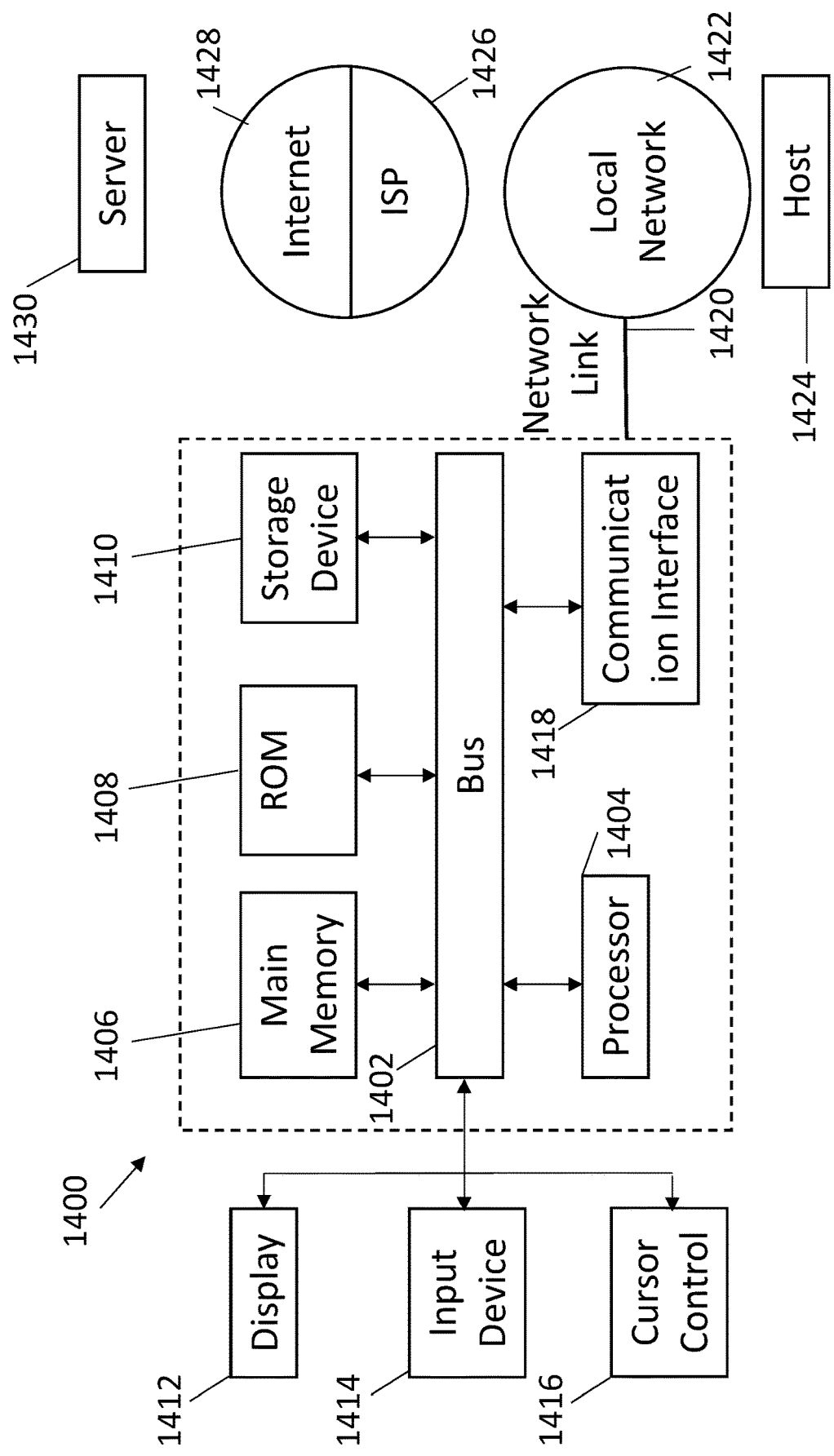
FIG. 14 is a block diagram showing an example of a computer system upon which aspects of this disclosure may be implemented.

FIG. 14 is a block diagram showing an example a computer system 1400 upon which aspects of this disclosure may be implemented. The computer system 1400 may include a bus 1402 or other communication mechanism for communicating information, and a processor 1404 coupled with the bus 1402 for processing information. The computer system 1400 may also include a main memory 1406, such as a random-access memory (RAM) or other dynamic storage device, coupled to the bus 1402 for storing information and instructions to be executed by the processor 1404. The main memory 1406 may also be used for storing temporary variables or other intermediate information during execution of instructions to be executed by the processor 1404. The computer system 1400 may implement a central processing unit, for example, such as the CPU 1310 for running the operations shown in FIG. 13.

The computer system 1400 may further include a read only memory (ROM) 1408 or other static storage device coupled to the bus 1402 for storing static information and instructions for the processor 1404. A storage device 1410, such as a flash or other non-volatile memory may be coupled to the bus 1402 for storing information and instructions.

The computer system 1400 may be coupled via the bus 1402 to a display 1412, such as a liquid crystal display (LCD), for displaying information. One or more user input devices 1414 may be coupled to the bus 1402, and may be configured for receiving various user inputs, such as user command selections and communicating these to the processor 1404, or to the main memory 1406. The user input device 1414 may include physical structure, or virtual implementation, or both, providing user input modes or options, for controlling, for example, a cursor control 1416, visible to a user through display 1412 or through other techniques, and such modes or operations may include, for example virtual mouse, trackball, or cursor direction keys.

The computer system 1400 may include respective resources of the processor 1404 executing, in an overlapping or interleaved manner, respective program instructions. Instructions may be read into the main memory 1406 from another machine-readable medium, such as the storage device 1410. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 1410. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 1400 may also include a communication interface 1418 coupled to the bus 1402, for two-way data communication coupling to a network link 1420 connected to a local network 1422. The network link 1420 may provide data communication through one or more networks to other data devices. For example, the network link 1420 may provide a connection through the local network 1422 to a host computer 1424 or to data equipment operated by an Internet Service Provider (ISP) 1426 to access through the Internet 1428 and a server 1430, for example, to obtain code for an application program.

In various implementations, a wetness sensor device may comprise a non-contact sensor, enabling measurement of wetness/dryness without making direct contact with the powder being monitored or measured. Such non-contact sensors may include, for example, optical sensors or acoustic sensors (e.g., ultrasonic sensor). In some implementations, the optical sensor may comprise lasers with visible, UV, or infra-red light. For example, a first non-contact sensor may be positioned above the powder before the powder travels through a wetting station of a 3D printing system, and a second non-contact sensor may be positioned above the powder after the powder exits the wetting station of the 3D printing system. The first non-contact sensor may comprise a first laser and a first sensing photo-detector which are configured to operate to measure a parameter of the reflected light when the first laser is directed at the powder (e.g. at an upper surface of the powder) before the powder enters the wetting station. The second non-contact sensor may comprise a second laser and a second sensing photo-detector which are configured to operate to measure a parameter of the reflected light when the second laser is directed at the powder (e.g. at an upper surface of the powder) as the powder exits (or after the powder has exited) the wetting station. For example, the parameter, which varies in dependence on an amount of a wetting agent (e.g., moisture) in the powder, may comprise the reflective index, light intensity or the time taken for the light to be reflected, though other parameters will be apparent to those of skill in the art. The two measurements when compared using, for example, a computer system, provide information indicative of a change in wetness/dryness of the powder. Should the difference between the measurements be outside what is considered to be an acceptable range, a methodology similar to that described above may be incorporated to facilitate automation of the process, enabling control of the wetting agent dispenser to control the amount of the wetting agent in the powder (e.g. moisture content) based on the output of the sensor device. It will be appreciated that the non-contact optical sensors may be placed at alternative locations, for example inside the wetting station to determine various wetting or drying conditions.

It is noted that although the above description has primarily been presented in terms of determining the degree of wetting of a powder on a substrate with a deposited layer in the environment of additive manufacturing, such as 3D printing, the method and system of this disclosure is not limited to only such methods and systems, and could be used in any situation where it is desired to determine the degree of wetting or drying of any powder, or any other liquid permeable material being monitored. It is also noted that, although a number of the implementations discussed above utilize a reservoir for containing the sensor(s) and a powder/wetting agent mixture, the wetting sensors disclosed herein can be utilized to monitor the degree of wetness, or dryness, in any wetting agent absorbing material/wetting agent mixture.

It is also noted that, although specific examples of processing steps for a 3D printing operation have been illustrated and discussed, the order of the processing steps could be changed, if desired, and/or additional processing steps could be added prior to final stacking of the layers.

In the following, further features, characteristics and advantages of the instant application will be described by means of items:

Item 1: A wetness sensor for detecting amounts of a wetting agent in a wetting agent absorbing material, including a sensor device located in contact with the wetting agent absorbing material and configured to monitor a parameter of the wetting agent absorbing material which varies in dependence on an amount of the wetting agent in the wetting agent absorbing material.

Item 2: The wetness sensor of item 1, wherein the sensor device is configured to monitor changes in an electrical resistance or an electrical conductivity of the wetting agent absorbing material in dependence on an amount of the wetting agent in the wetting agent absorbing material.

Item 3: The wetness sensor of item 1 or 2, wherein the wetting agent is comprised of steam applied to the wetting agent absorbing material.

Item 4: The wetness sensor of any one of items 1-3, wherein the wetting agent is comprised of liquid binder material applied to the wetting agent absorbing material.

Item 5: The wetness sensor of any one of items 1-4, wherein the sensor device is configured to provide an output in real time indicative of the amount of the wetting agent in the wetting agent absorbing material.

Item 6: The wetness sensor of any one of items 1-5, wherein the sensor device is embedded in the wetting agent absorbing material so that the wetting agent absorbing material is located above and below the sensor device.

Item 7: The wetness sensor of any one of items 1-6, further comprising a reservoir in which the sensor device and the wetting agent absorbing material are located.

Item 8: The wetness sensor of any one of items 1-7, further comprising a heating element located in the reservoir spaced apart from the sensor device and configured to heat the wetting agent absorbing material to dry the wetting agent absorbing material to control the amount of wetting agent in the wetting agent absorbing material.

Item 9: The wetness sensor of any one of items 1-8, wherein the heating element is located in the reservoir at a location below the sensor device.

Item 10: The wetness sensor of any one of items 1-9, wherein the heating element is located along at least one sidewall of the reservoir.

Item 11: The wetness sensor of any one of items 1-10, further comprising at least one additional sensor device embedded in the wetting agent absorbing material spaced apart from the sensor device with a portion of the wetting agent absorbing material interposed between the sensor device and the additional sensing device to provide measurements of wetness of the wetting agent absorbing material at different depths of the wetting agent absorbing material.

Item 12: The wetness sensor of any one of items 1-11, wherein the at least one additional sensor device is located at a bottom of the reservoir to determine if the wetting agent has completely permeated the wetting agent absorbing material.

Item 13: The wetness sensor of any one of items 1-12, wherein the reservoir is located adjacent to a 3D printing apparatus that deposits and processes powder as part of a 3D printing operation, and wherein a depth of the wetting agent absorbing material in the reservoir corresponds to a depth of the wetting agent in the powder used for the 3D printing operation.

Item 14: The wetness sensor of any one of items 1-13, further comprising a heating element located in the reservoir spaced apart from the sensor device and the at least one additional sensor device and configured to heat the wetting agent absorbing material to dry the wetting agent absorbing material to control the amount of wetting agent in the wetting agent absorbing material.

Item 15: The wetness sensor of any one of items 1-14, wherein the sensor device is located at a bottom of a reservoir in which the wetting agent absorbing material is contained so that the sensor device determines when the wetting agent has completely permeated the wetting agent absorbing material.

Item 16: The wetness sensor of any one of items 1-15, wherein an output of the sensor device is coupled to a control device for controlling an amount of the wetting agent applied to the wetting agent absorbing material based on the output of the sensor device.

Item 17: The wetness sensor of any one of items 1-16, wherein outputs of the sensor device and the at least one additional sensor device are coupled to a control device for controlling an amount of the wetting agent applied to the wetting agent absorbing material based on the outputs of the sensor device and the at least one additional sensor device.

Item 18: The wetness sensor of any one of items 1-17, wherein an output of the sensor device is coupled to a control device for controlling a drying device for drying the wetting agent absorbing material based on the output of the sensor device.

Item 19: The wetness sensor of any one of items 1-18, wherein the sensor device includes a first electrode including a first common portion extending in a first direction and a plurality of first finger elements extending from the first common portion in a second direction, wherein the first finger elements are substantially parallel to one another, a second electrode including a second common portion extending in the first direction and a plurality of second finger elements extending from the second common portion in the second direction, wherein the second finger elements are substantially parallel to one another, and wherein the first and second common portions are substantially parallel to one another, and the second finger elements are interdigitated with and substantially parallel to the first finger elements, a first electrode terminal coupled to the first common portion and a second electrode terminal coupled to the second common portion, wherein each of the first and second electrode terminals is coupled to an electronic measuring device, wherein the wetting agent absorbing material is formed over the first and second electrodes and changes an electrical signal measured by the electronic measuring device based on an amount of the wetting agent that has been absorbed by the wetting agent absorbing material.

Item 20: The wetness sensor of any one of items 1-19, wherein the first finger elements are substantially perpendicular to the first common portion, and wherein the second finger elements are substantially perpendicular to the second common portion.

Item 21: The wetness sensor of any one of items 1-20, wherein the wetting agent absorbing material is located above and between the interdigitated first finger elements and second finger elements.

Item 22: The wetness sensor of any one of items 1-21, wherein the wetting agent absorbing material is located below and between the interdigitates first finger elements and second finger elements.

Item 23: A computer system for controlling wetting of a powder layer with a wetting agent in a 3D printing process by detecting amounts of the wetting agent in a wetting agent absorbing material in a reservoir adjacent to the powder layer, including a processor and a memory coupled to the processor, configured to store executable instructions that, when executed by the processor, cause the processor to: activate a wetting agent absorbing material dispenser to deposit the wetting agent absorbing material in the reservoir, wherein the wetting agent absorbing material has an absorption rate for the wetting agent corresponding to an absorption rate of the powder layer for the wetting agent: activate a wetting agent dispenser above the reservoir to apply the wetting agent to the deposited wetting agent absorbing material; monitor an output from a sensor device embedded in the wetting agent absorbing material, wherein the sensor device is configured to monitor a parameter of the wetting agent absorbing material which varies in dependence on an amount of the wetting agent in the wetting agent absorbing material: and control an amount of the wetting agent applied to the powder layer based on the output from the sensor device.

Item 24: The computer system of item 23, wherein the wetting agent is comprised of steam applied to the powder layer and the wetting agent absorbing material.

Item 25: The computer system of item 23 or 24, wherein the wetting agent is comprised of liquid binder material applied to the powder layer and to the wetting agent absorbing material.

Item 26: The computer system of any one of items 23-25, further comprising executable instructions that, when executed by the processor, cause the processor to activate a heating element located in contact with the wetting agent absorbing material to heat the wetting agent absorbing material following receiving a measurement of the amount of wetting agent in the wetting agent absorbing material, to dry the wetting agent absorbing material, and activate the wetting agent dispenser to apply a new amount of the wetting agent to the wetting agent absorbing material in the reservoir for controlling wetting of a new powder layer being processed after the wetting agent absorbing material has been dried to a predetermined level by the heating element as determined by the sensor device.

Item 27: The computer system of any one of items 23-26, further comprising executable instructions that, when executed by the processor, cause the processor to monitor an output from at least one additional sensor device embedded in the wetting agent absorbing material spaced apart from the sensor device with a portion of the wetting agent absorbing material interposed between the sensor device and the additional sensor device to provide measurements of wetness of the wetting agent absorbing material at different depths of the wetting agent absorbing material.

Item 28: The computer system of any one of items 23-27, further comprising executable instructions that, when executed by the processor, cause the processor to monitor an output from at least one additional sensor device located at the bottom of the reservoir to determine if the wetting agent has completely permeated the wetting agent absorbing material.

Item 29: The computer system of any one of items 23-28, further comprising executable instructions that, when executed by the processor, cause the processor to control an amount of the wetting agent applied to the wetting agent absorbing material by the wetting agent dispenser based on the output of the sensor device.

Item 30: The computer system of any of items 23-29, wherein the wetting agent dispenser is comprised of a steam dispenser in a steam chamber.

Item 31: The computer system of any of items 23-30, wherein the wetting agent dispenser is comprised of a liquid binder dispenser.

Item 32: The computer system of any of items 23-31, further comprising executable instructions that, when executed by the processor, cause the processor to control a drying device for drying the wetting agent absorbing material based on the output of the sensor device.

Item 33: A method for controlling amounts of a wetting agent in a powder being processed in a 3D printing operation, including activating a powder dispenser to deposit the powder on a substrate, activating a wetting agent dispenser to apply a wetting agent to the deposited powder, monitoring an output from a sensor device embedded in the powder to determine an amount of the wetting agent in the powder, wherein the sensor device is configured to monitor a parameter of the powder which varies in dependence on an amount of the wetting agent in the powder, and controlling the wetting agent dispenser to control the amount of wetting agent in the powder based on the output of the sensor device.

Item 34: A method for controlling dryness of a powder being processed in a 3D printing operation, including activating a heating element located in contact with the powder to heat the powder following receiving a measurement of the amount of wetting agent in the powder from the output of a sensor device embedded in the powder, to dry the powder, determining, via the sensor device, if the powder has reached a predetermined amount of dryness, and controlling the heating element to control the amount of heat applied to the powder based on the output of the sensor device.

Item 35: A computer system for controlling wetting of a powder layer with a wetting agent in a 3D printing process by detecting amounts of the wetting agent in the powder layer, including a processor and a memory coupled to the processor, configured to store executable instructions that, when executed by the processor, cause the processor to activate a powder dispenser to deposit the powder on a substrate to form the powder layer, activate a wetting agent dispenser to apply the wetting agent to the deposited powder layer, monitor an output from a sensor device embedded in the powder layer, wherein the sensor device is configured to monitor a parameter of the powder layer which varies in dependence on an amount of the wetting agent in the powder layer, control an amount of the wetting agent applied to the powder layer based on the output from the sensor device.

Item 36: The computer system of item 35, wherein the amount of wetting agent is controlled by controlling the wetting agent dispenser to increase or decrease an amount of the wetting agent applied to the powder layer based on the output from the sensor device.

Item 37: The computer system of item 35 or 36, wherein the amount of the wetting agent is controlled by controlling an amount of heat applied to the powder layer based on the output from the sensor device.

Item 38: The computer system of any one of items 35-37, wherein the wetting agent comprises steam.

Item 39: The computer system of any one of items 35-38, wherein the wetting agent comprises a liquid binder.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The invention claimed is:

1. A wetness sensor for detecting amounts of a wetting agent in a wetting agent absorbing material, comprising:
   a sensor device located in contact with the wetting agent absorbing material and configured to monitor a parameter of the wetting agent absorbing material which varies in dependence on an amount of the wetting agent in the wetting agent absorbing material; and
   at least one additional sensor device embedded in the wetting agent absorbing material and spaced apart from the sensor device with a portion of the wetting agent absorbing material interposed between the sensor device and the at least one additional sensing device to provide measurements of wetness of the wetting agent absorbing material at different depths of the wetting agent absorbing material.

2. The wetness sensor of claim 1, wherein the sensor device is configured to monitor changes in an electrical resistance or an electrical conductivity of the wetting agent absorbing material in dependence on an amount of the wetting agent in the wetting agent absorbing material.

3. The wetness sensor of claim 1, wherein the wetting agent is comprised of steam applied to the wetting agent absorbing material.

4. The wetness sensor of claim 1, wherein the wetting agent is comprised of liquid binder material applied to the wetting agent absorbing material.

5. The wetness sensor of claim 1, wherein the sensor device is configured to provide an output in real time indicative of the amount of the wetting agent in the wetting agent absorbing material.

6. The wetness sensor of claim 1, wherein the sensor device is embedded in the wetting agent absorbing material so that the wetting agent absorbing material is located above and below the sensor device.

7. The wetness sensor of claim 1, further comprising a reservoir in which the sensor device and the wetting agent absorbing material are located.

8. The wetness sensor of claim 7, further comprising a heating element located in the reservoir spaced apart from the sensor device and configured to heat the wetting agent absorbing material to dry the wetting agent absorbing material to control the amount of wetting agent in the wetting agent absorbing material.

9. The wetness sensor of claim 8, wherein the heating element is located in the reservoir at a location below the sensor device.

10. The wetness sensor of claim 8, wherein the heating element is located along at least one sidewall of the reservoir.

11. The wetness sensor of claim 1, wherein the at least one additional sensor device is located at a bottom of the reservoir to determine if the wetting agent has completely permeated the wetting agent absorbing material.

12. The wetness sensor of claim 1, wherein the reservoir is located adjacent to a 3D printing apparatus that deposits and processes powder as part of a 3D printing operation, and wherein a depth of the wetting agent absorbing material in the reservoir corresponds to a depth of the wetting agent in the powder used for the 3D printing operation.

13. The wetness sensor of claim 1, further comprising a heating element located in the reservoir spaced apart from the sensor device and the at least one additional sensor device and configured to heat the wetting agent absorbing material to dry the wetting agent absorbing material to control the amount of wetting agent in the wetting agent absorbing material.

14. The wetness sensor of claim 1, wherein the sensor device is located at a bottom of a reservoir in which the wetting agent absorbing material is contained so that the sensor device determines when the wetting agent has completely permeated the wetting agent absorbing material.

15. The wetness sensor of claim 1, wherein an output of the sensor device is coupled to a control device for controlling an amount of the wetting agent applied to the wetting agent absorbing material based on the output of the sensor device.

16. The wetness sensor of claim 1, wherein outputs of the sensor device and the at least one additional sensor device are coupled to a control device for controlling an amount of the wetting agent applied to the wetting agent absorbing material based on the outputs of the sensor device and the at least one additional sensor device.

17. The wetness sensor of claim 1, wherein an output of the sensor device is coupled to a control device for controlling a drying device for drying the wetting agent absorbing material based on the output of the sensor device.

18. A wetness sensor for detecting amounts of a wetting agent in a wetting agent absorbing material, comprising:
a sensor device located in contact with the wetting agent absorbing material and configured to monitor a parameter of the wetting agent absorbing material which varies in dependence on an amount of the wetting agent in the wetting agent absorbing material, the sensor device comprising:
a first electrode including a first common portion extending in a first direction and a plurality of first finger elements extending from the first common portion in a second direction, wherein the first finger elements are substantially parallel to one another;
a second electrode including a second common portion extending in the first direction and a plurality of second finger elements extending from the second common portion in the second direction, wherein the second finger elements are substantially parallel to one another, and wherein the first and second common portions are substantially parallel to one another, and the second finger elements are interdigitated with and substantially parallel to the first finger elements; and
a first electrode terminal coupled to the first common portion and a second electrode terminal coupled to the second common portion, wherein each of the first and second electrode terminals is coupled to an electronic measuring device;
wherein the wetting agent absorbing material is formed over the first and second electrodes and changes an electrical signal measured by the electronic measuring device based on an amount of the wetting agent that has been absorbed by the wetting agent absorbing material.

19. The wetness sensor of claim 18, wherein the first finger elements are substantially perpendicular to the first common portion, and wherein the second finger elements are substantially perpendicular to the second common portion.

20. The wetness sensor of claim 18, wherein the wetting agent absorbing material is located above and between the interdigitated first finger elements and second finger elements.

21. The wetness sensor of claim 18, wherein the wetting agent absorbing material is located below and between the interdigitates first finger elements and second finger elements.

22. A computer system for controlling wetting of a powder layer with a wetting agent in a 3D printing process by detecting amounts of the wetting agent in a wetting agent absorbing material in a reservoir adjacent to the powder layer, comprising:
a processor; and
a memory coupled to the processor, configured to store executable instructions that, when executed by the processor, cause the processor to:
activate a wetting agent absorbing material dispenser to deposit the wetting agent absorbing material in the reservoir, wherein the wetting agent absorbing material has an absorption rate for the wetting agent corresponding to an absorption rate of the powder layer for the wetting agent;
activate a wetting agent dispenser above the reservoir to apply the wetting agent to the deposited wetting agent absorbing material;

monitor an output from a sensor device embedded in the wetting agent absorbing material, wherein the sensor device is configured to monitor a parameter of the wetting agent absorbing material which varies in dependence on an amount of the wetting agent in the wetting agent absorbing material;

control an amount of the wetting agent applied to the powder layer based on the output from the sensor device; and monitor an output from at least one additional sensor device embedded in the wetting agent absorbing material and spaced apart from the sensor device with a portion of the wetting agent absorbing material interposed between the sensor device and the at least one additional sensing device to provide measurements of wetness of the wetting agent absorbing material at different depths of the wetting agent absorbing material.

23. A method for controlling amounts of a wetting agent in a powder being processed in a 3D printing operation, comprising:

activating a powder dispenser to deposit the powder on a substrate;

activating a wetting agent dispenser to apply a wetting agent to the deposited powder;

monitoring an output from a sensor device embedded in the powder to determine an amount of the wetting agent in the powder, wherein the sensor device is configured to monitor a parameter of the powder which varies in dependence on an amount of the wetting agent in the powder;

monitoring an output from at least one additional sensor device embedded in the wetting agent absorbing material and spaced apart from the sensor device with a portion of the wetting agent absorbing material interposed between the sensor device and the at least one additional sensing device to provide measurements of wetness of the wetting agent absorbing material at different depths of the wetting agent absorbing material; and controlling the wetting agent dispenser to control the amount of wetting agent in the powder based on the output of the sensor device.

24. A method for controlling dryness of a powder being processed in a 3D printing operation, comprising:

activating a heating element located in contact with the powder to heat the powder following receiving a measurement of an amount of wetting agent in the powder from the output of a sensor device embedded in the powder, to dry the powder;

determining, via the sensor device, if the powder has reached a predetermined amount of dryness; and controlling the heating element to control the amount of heat applied to the powder based on the output of the sensor device;

monitoring an output from at least one additional sensor device embedded in the wetting agent absorbing material and spaced apart from the sensor device with a portion of the wetting agent absorbing material interposed between the sensor device and the at least one additional sensing device to provide measurements of wetness of the wetting agent absorbing material at different depths of the wetting agent absorbing material.

25. A computer system for controlling wetting of a powder layer with a wetting agent in a 3D printing process by detecting amounts of the wetting agent in the powder layer, comprising:

a processor; and a memory coupled to the processor, configured to store executable instructions that, when executed by the processor, cause the processor to:

activate a powder dispenser to deposit the powder on a substrate to form the powder layer;

activate a wetting agent dispenser to apply the wetting agent to the deposited powder layer;

monitor an output from a sensor device embedded in the powder layer, wherein the sensor device is configured to monitor a parameter of the powder layer which varies in dependence on an amount of the wetting agent in the powder layer; and control an amount of the wetting agent applied to the powder layer based on the output from the sensor device;

monitor an output from at least one additional sensor device embedded in the wetting agent absorbing material and spaced apart from the sensor device with a portion of the wetting agent absorbing material interposed between the sensor device and the at least one additional sensing device to provide measurements of wetness of the wetting agent absorbing material at different depths of the wetting agent absorbing material.

* * * * *